June 12, 1962     T. E. FIDDLER     3,038,223
SHEET METAL FASTENER DEVICE
Filed June 17, 1959
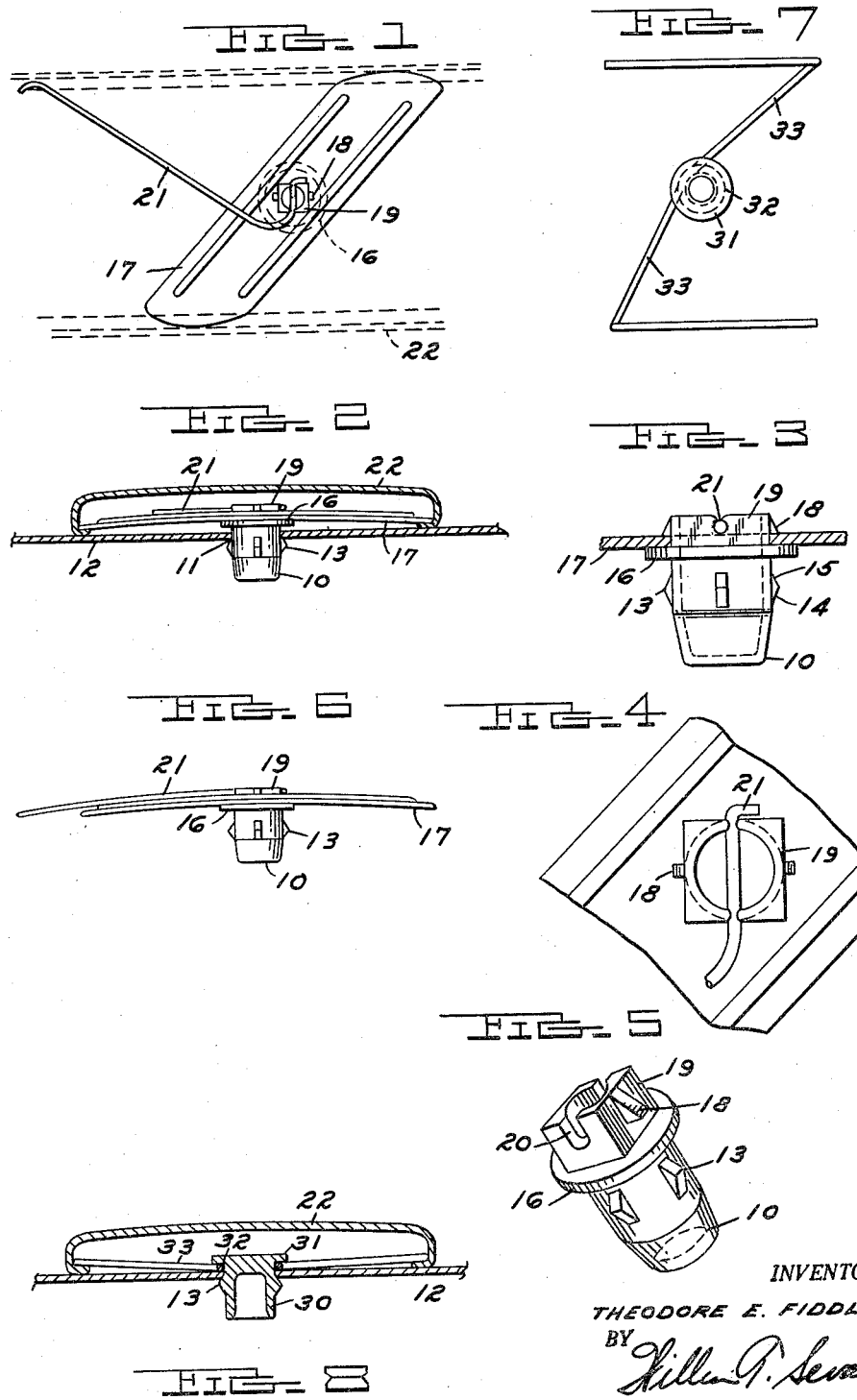
INVENTOR.
THEODORE E. FIDDLER
BY
ATTORNEY

United States Patent Office 3,038,223
Patented June 12, 1962

3,038,223
SHEET METAL FASTENER DEVICE
Theodore E. Fiddler, 1200 Cedar Ave.,
Birmingham, Mich.
Filed June 17, 1959, Ser. No. 820,897
6 Claims. (Cl. 24—73)

This invention relates to sheet metal molding fasteners and clips.

Fasteners and clips have been employed heretofore to facilitate the mounting of molding on sheet metal such as in automobiles and home appliances, however, the several devices of the prior art have not proven entirely satisfactory inasmuch as they are complicated in design and construction, expensive to manufacture, difficult to use, and unsatisfactory in maintenance and repair as they and the adjacent sheet metal rust and disintegrate because of the unsealed aperture formed therein and the water trapping aspects of the molding and attaching clips or fasteners.

With the foregoing in view, the primary object of the invention is to provide a clip or fastener for moldings which is simple in design and construction, inexpensive to manufacture, easy to use, easy to remove, and which is made of non-rusting material so as to prevent rusting and disintegration and which seals the aperture in the sheet metal so that rusting and disintegration of the sheet metal is also prevented.

An object of the invention is to provide a clip or fastener which is so designed and constructed so that it is feasible to make it of synthetic resin material to provide non-rusting characteristics and sealing capabilities relative to the sheet material receiving aperture.

An object of the invention is to provide a plug portion for the fastener which may be round, square, or otherwise shaped similar to the receiving aperture.

An object of the invention is to provide a compression spring type plug portion which is spring loaded upon insertion of the plug into the sheet material which spring loading in conjunction with cam surfaces forces the plug axially-endwardly to hold the plug in the aperture.

An object of the invention is to provide a span member easily attached to the plug portion which also may be made of synthetic material or metal as desired.

An object of the invention is to mold all the parts of the fastener or clip at one time in one operation such as by injection molding.

An object of the invention is to provide a head portion on the plug which extends radially above the span portion and which has attached therein a spring torsion arm for biasing the angular position of the span portion.

An object of the invention is to provide a receiving slot in the plug head portion adapted to be welded or swaged over the arm portion thereby annexing the spring arm to the device.

An object of the invention is to mechanically secure the span portion to the plug at the same time as securing the spring arm to the plug which the spring arm bearing against the span portion to hold same in secured relationship.

These and other objects of the invention will become apparent by reference to the following description of a molding clip or fastener embodying the invention taken in connection with the accompanying drawing in which:

FIG. 1 is a plan view of clip embodying the invention showing the molding in dotted lines.

FIG. 2 is a cross sectional view of the device seen in FIG. 1 showing the fastener in elevation and the sheet metal and molding is cross section.

FIG. 3 is an enlarged view of the plug portion of the device seen in FIG. 2.

FIG. 4 is a top plan view of the device seen in FIG. 3.

FIG. 5 is a perspective view of the plug portion of the device.

FIG. 6 is a side elevational view of the clip shown in FIG. 2 showing the spring aspects of the span portion.

FIG. 7 is a view similar to FIG. 1 showing a combined spring arm and span portion; and FIG. 8 is a cross sectional view of the device seen in FIG. 7, similar to FIG. 2, showing all the elements in cross section.

Referring now to the drawing wherein like numerals refer to like and corresponding parts throughout the several views, the molding clip or fastener disclosed therein to illustrate the invention comprises a plug 10 for engaging the sheet metal, a span portion 17 for engaging the molding, and a spring arm 21 for biasing the span portion 17 into forced contact with the molding; the clip being molded in one piece, if desired.

More particularly the inventive clips comprise a plug member 10 insertable through the opening 11 of the sheet metal 12 equipped with radial dogs 13 thereon having first upwardly-outwardly inclining cam surfaces 14 adapted to react against the aperture walls to compress and spring load the plug 10 as the surfaces 14 are forced pass the aperture 11 walls, second cam surfaces 15 above the cam surfaces 14 inwardly-upwardly inclining as to exert an axially inward pulling force on the plug 10 by their camming engagement with the sheet metal 12 walls defining the aperture 11 so as to cam the plug inwardly of the sheet metal 12 thereby providing axial pulling force on the plug, a radial flange 16 on the plug 10, a span member 17 abutting the flange 16, and radial tangs 18 on the plug head 19 spaced above the flange 16 with the tangs 18 being adapted to by-pass the span member 17 aperture as it is forced over the head 19 and to spring outwardly after the span member 17 has passed the tangs 18 so as to lock the span member 17 on the plug 10, a transverse slot 20 in the head 19, and a spring arm 21 disposed in the slot 20 and it is noted that the head 19 material is weldable or swagable over the arm 21 so as to hold it firmly annex thereto. The tangs 18 may be deleted and the spring arm 21 as fixed in the head 19 holding the span member 17 in connected relationship to the plug 10 and in the event that a torsional type device is desired the aperture of the span member 19 is square and the head 19 is square so as to provide a rotational drive between the head and the span member as urged by the arm 21 and it is to be noted that the span member 17 is slightly arched as seen in FIG. 6 and is torsionally sprung against the molding 22 as seen in FIG. 2 to hold the molding in pressed relationship against the sheet metal 12. The plug 19 is made of resilient or semi-resilient material and is preferably injection molded of synthetic resin with its interior hollow as to provide spring walls in the plug for permitting the dogs to move inwardly and expand outwardly in gripping relationship to the sheet material 12.

In the embodiments of FIGS. 7 and 8, the plug 30 has radial dogs 13 for engaging the sheet metal 12 as hereinbefore previously described and a head 31 overlying the loop 32 in the spring span member 33 with the plug 30 being first insertable through the loop 32 or other means of the span member 33. The device is securable in a molding 22 by disposing of the span member therein with either the plug and span member being first insertable in the molding 22 or first insertable on the sheet metal 12 as desired and it is to be noted that the span member 33 is disclosed as Z-shaped with a loop 32 but it is obvious that the span member 33 can be of any desired shape and that the loop 32 can be an aperture formed through the span member 33 if desired as shown in the other figures.

The span member 33 angularly spring-wise bears against the molding in a radial direction and it is also axially spring-wise biased when integrated as seen in FIG. 8 to hold the molding closely adjacent the sheet metal.

While the plug 30 has been shown and described in conjunction with the spring spanning member 33 it is perfectly obvious that it can be integrated with a span member 17 or any other desired type and that a head can be formed on the plug 30 for receiving a spring arm 21 therein if desired.

The inventive fasteners with these features constitute a compact, durable, and neat appearing mechanism easily operated to install in a molding and to install the molding on sheet metal and due to the design and structure of the plugs they can be easily manufactured of synthetic resin by injection molding.

Although but a few embodiments of the invention have been shown and described in detail, it is obvious that many changes may be made in the size, shape, detail, and arrangement of the various elements of the invention within the scope of the appended claims.

I claim:

1. A fastener device particularly suitable for mounting molding on sheet material having a receiving aperture comprising a plug portion axially insertable in an aperture in close nesting relationship, dogs on said plug radially extending therefrom to a point beyond the walls of a receiving aperture, first cam surfaces on said dogs upwardly-outwardly inclining adapted to compress and spring load said plug as said surfaces are forced past the aperture walls, second cam surfaces on said dogs above said first cam surfaces inwardly-upwardly inclining so as to exert an axially inward force on said plug by camming against the aperture walls under the radial outward force of the compressed spring-loaded plug; said plug having an outer end above the sheet material; and a span member on said plug outer end adapted to bear toward the sheet material adjacent the aperture in pressed relationship thereto in reaction to said plugs axially inward pulling force to snugly mount said device on sheet material; said span member being adapted to engage a molding for mounting same on the sheet material; said plug having a radial flange on its outer end, a head on said plug outer end above said flange, and radial tangs on said head spaced above said flange having downwardly-outwardly inclined surfaces; said span member having an opening surrounding said head lying against said flange under said tangs; said span member being mountable on said device by forcing said opening over said head and tangs as allowed by the spring action of said head and tangs.

2. In a device as set forth in claim 1 said span member having a relatively narrow dimension for permitting insertion into a molding; said span member having a relatively long dimension for engaging the side flanges of a molding; said head having a diametrical opening; and a spring arm disposed in said head opening extending radially therefrom for engaging a molding flange for torsionally spring-wise pressing thereagainst to swing and hold said span member long dimension into spring pressed attaching relationship with the flanges of a molding for securing the device on a molding and the molding on the device.

3. In a device as set forth in claim 2, said head opening having endwise opening slots; said head material being deformable for swaging against said arm for connecting same firmly together.

4. A fastener device particularly suitable for mounting molding on sheet material having a receiving aperture comprising a plug portion axially insertable in an aperture in close nesting relationship, dogs on said plug radially extending therefrom to a point beyond the walls of a receiving aperture, first surfaces on said dogs upwardly-outwardly inclining adapted to compress and spring load said plug as said surfaces are forced past the aperture walls, second surfaces on said dogs above said first surfaces extending inwaldly forming a block for bearing against the sheet material; said plug having an outer end; and a spring span member on said plug outer end adapted to bear toward the sheet material adjacent the aperture in pressed relationship thereto in reaction to said plugs axially inward holding force to snugly mount said device on sheet material; said span member being adapted to engage a molding for mounting same on the sheet material; said plug having a radial flange on its outer end, a head on said plug outer end above said flange, and radial tangs on said head spaced above said flange having downwardly outwardly inclined surfaces; said span member having an opening surrounding said head lying against said flange under said tangs, said span member being mountable on said device by forcing said opening over said head and tangs as allowed by the spring action of said head and tangs.

5. In a device as set forth in claim 4, said span member having a relatively narrow dimension for permitting insertion into a molding; said span member having a relatively long dimension for engaging the side flanges of a molding; said head having diametrical opening; and a spring arm disposed in said head opening extending radially therefrom for engaging a molding flange for torsionally spring-wise pressing thereagainst to swing and hold said span member long dimension into spring pressed attaching relationship with the flanges of a molding for securing the device on a molding and the molding on the device; said arm bearing against said base member for securing same on said plug.

6. In a device as set forth in claim 4, said head having endwise opening slots; said head material being deformable for swaging against said arm for connecting same firmly together.

References Cited in the file of this patent

UNITED STATES PATENTS 2,713,186    Borowsky _____ July 19, 1955

FOREIGN PATENTS 546,146    Great Britain _____ June 30, 1942
745,788    Great Britain _____ Feb. 29, 1956